US008505949B2

(12) United States Patent
Temple et al.

(10) Patent No.: US 8,505,949 B2
(45) Date of Patent: Aug. 13, 2013

(54) AUTOMATIC PNEUMATIC/ELECTRICAL COUPLER SYSTEM FOR TRACTOR-TRAILER COMBINATION VEHICLES

(75) Inventors: Kevin Temple, Rochester, MI (US); Ryan Sullivan, Rochester, MI (US); Jason Hammel, Neenah, WI (US); Andrew Jaworski, Kansas City, MO (US); Kevin Bence, Grand Rapids, MI (US)

(73) Assignee: SAF-Holland, Inc., Holland, MI (US)

( * ) Notice: Subject to any disclaimer, the term of this patent is extended or adjusted under 35 U.S.C. 154(b) by 539 days.

(21) Appl. No.: 12/758,173

(22) Filed: Apr. 12, 2010

(65) Prior Publication Data

US 2011/0037241 A1  Feb. 17, 2011

Related U.S. Application Data (60) Provisional application No. 61/168,396, filed on Apr. 10, 2009.

(51) Int. Cl.
*B60D 1/64* (2006.01)
*B62D 53/12* (2006.01)

(52) U.S. Cl.
CPC ............... *B60D 1/64* (2013.01); *B62D 53/125* (2013.01)
USPC ............................ 280/420; 280/421; 280/422

(58) Field of Classification Search
USPC .......................................... 280/420, 421, 422
See application file for complete search history.

(56) References Cited

U.S. PATENT DOCUMENTS 3,628,811 A * 12/1971 Rivers ........................... 280/421
3,711,122 A * 1/1973 Holmberg et al. ............ 280/421
3,888,513 A * 6/1975 Pilz et al. ...................... 280/421

(Continued)

FOREIGN PATENT DOCUMENTS

DE       4435630 A1    5/1996
DE      19705275 A1    9/1998

(Continued)

OTHER PUBLICATIONS

BSI Group, "Standard in development: BS ISO 13044-1 Road Vehicles—Fully Automatic Coupling Systems 24 V (FACS) for heavy commercial vehicle combinations—Part 1: General Requirements and Definitions," http:// standardsdevelopment.bsigroup.com/ Home/Project/200903347, The British Standards Institution, Jan. 7, 2011.

(Continued)

*Primary Examiner* — Paul N Dickson
*Assistant Examiner* — Wesley Potter
(74) *Attorney, Agent, or Firm* — Price Heneveld LLP (57) ABSTRACT

A powered coupling system is configured to interconnect utility lines such as fluid and/or electric lines of a vehicle tractor to a trailer. A curved track is mounted to a frame of the tractor, and the system includes pneumatic and/or electrical connectors that move along the curved track to align the connectors with a corresponding connectors on a trailer. A linear actuator causes the connectors on the tractor to shift vertically to connect and disconnect the connectors on the tractor to connectors on the trailer. The curved track permits alignment of the connectors on the tractor with the connectors on the trailer even if the trailer is not in a straight line with the tractor.

23 Claims, 6 Drawing Sheets (56) References Cited

U.S. PATENT DOCUMENTS

| | | | | |
|---|---|---|---|---|
| 3,941,408 | A | * | 3/1976 | Petersson ............... 280/421 |
| 4,943,079 | A | * | 7/1990 | Harbold ................. 280/420 |
| 5,346,239 | A | * | 9/1994 | Wohlhuter .............. 280/420 |
| 6,179,319 | B1 | * | 1/2001 | Malisch et al. .......... 280/477 |
| 7,967,319 | B2 | * | 6/2011 | Alguera ................. 280/420 |
| 2008/0100032 | A1 | * | 5/2008 | Alguera Gallego et al. .. 280/420 |

FOREIGN PATENT DOCUMENTS

| | | |
|---|---|---|
| DE | 29923081 U1 | 5/2000 |
| DE | 10201559 A1 | 10/2002 |
| DE | 20305175 U1 | 10/2003 |
| DE | 20307381 U1 | 10/2003 |
| DE | 102004024333 A1 | 12/2005 |
| DE | 202005018217 U1 | 5/2006 |
| DE | 102006033899 A1 | 1/2008 |
| EP | 1652697 A1 | 2/2001 |
| EP | 1777084 A1 | 7/2005 |
| EP | 1918179 A1 | 10/2006 |
| EP | 1998965 B1 | 3/2007 |
| EP | 1878629 A2 | 1/2008 |
| WO | 2004087475 A1 | 10/2004 |
| WO | 2004098965 A1 | 11/2004 |
| WO | 2007104544 A1 | 9/2007 |

OTHER PUBLICATIONS

BSI Group, "Standard in development: BS ISO 13044-1 Road Vehicles—Fully Automatic Coupling Systems 24 V (FACS) for heavy commercial vehicle combinations—Part 2: 50 mm fifth wheel couplings—electrical and pneumatic interface," http://standardsdevelopment.bsigroup.com/Home/Project/200903348, The British Standards Institution, Jan. 7, 2011.

* cited by examiner

AUTOMATIC PNEUMATIC/ELECTRICAL COUPLER SYSTEM FOR TRACTOR-TRAILER COMBINATION VEHICLES

CROSS-REFERENCE TO RELATED APPLICATIONS

This application claims priority under 35 U.S.C. §119(e) and the benefit of U.S. Provisional Application No. 61/168,396 entitled AUTOMATIC PNEUMATIC/ELECTRICAL COUPLER SYSTEM FOR TRACTOR-TRAILER COMBINATION VEHICLES, filed on Apr. 10, 2009, the entire disclosure of which is incorporated herein by reference.

BACKGROUND OF THE INVENTION

1. Field of the Invention

The present invention relates to an automated and/or remotely controlled system for the connection and disconnection of the pneumatic and electrical service connections between a tractor and trailer.

2. Technical Background

Connecting the pneumatic systems (service and emergency air) and electrical systems between tractor and trailer has typically required a driver or other user to manually interconnect two connectors (electric and air) that are typically located on a pair of extensible cables located on the back of the tractor and a set of mating receptacles mounted on the front of the trailer. This process requires the driver to exit the cab upon successfully coupling the tractor-trailer combination utilizing a fifth wheel device mounted on the tractor and a kingpin mounted on the trailer. The driver then typically climbs onto the rear frame of the tractor to access and manipulate the connection cables. This process is reversed upon tractor/trailer un-coupling.

Semi-automatic and fully automated pneumatic/electric coupling systems have been proposed, including concepts which utilize air and/or electrical connectors on/in the kingpin. Another approach utilizes a fixed connector on the fifth wheel or tractor frame and a moveable receiver assembly on the trailer to provide for misalignment between the tractor and the trailer.

SUMMARY OF THE INVENTION

A coupler system according to one aspect of the present invention includes a multi-function connector with flexible, extensible lines or cables, integrated with a tractor-mounted mechanism which provides lateral and vertical movement. The system may include a plurality of sensors and control logic which enable the multi-function connector to locate, mate, and lock with a receptacle mounted on a trailer. Once connected and locked, the tractor-mounted mechanism disengages and returns to a stowed or parked position, leaving the multifunction connector in place on the trailer. The coupler system is able to reverse the process, i.e., re-engage the multi-function connector, unlock and disconnect from the trailer-mounted receptacle, and return the multi-function connector to a stowed position on the tractor. The multi-function connector may include electrical and pneumatic connectors that operably interconnect the electrical and pneumatic systems of the tractor and trailer. The coupler system may be retrofitted to existing tractors and trailers or it may be installed during fabrication of the tractor and/or trailer.

DETAILED DESCRIPTION OF THE PREFERRED EMBODIMENT

Figure 1:
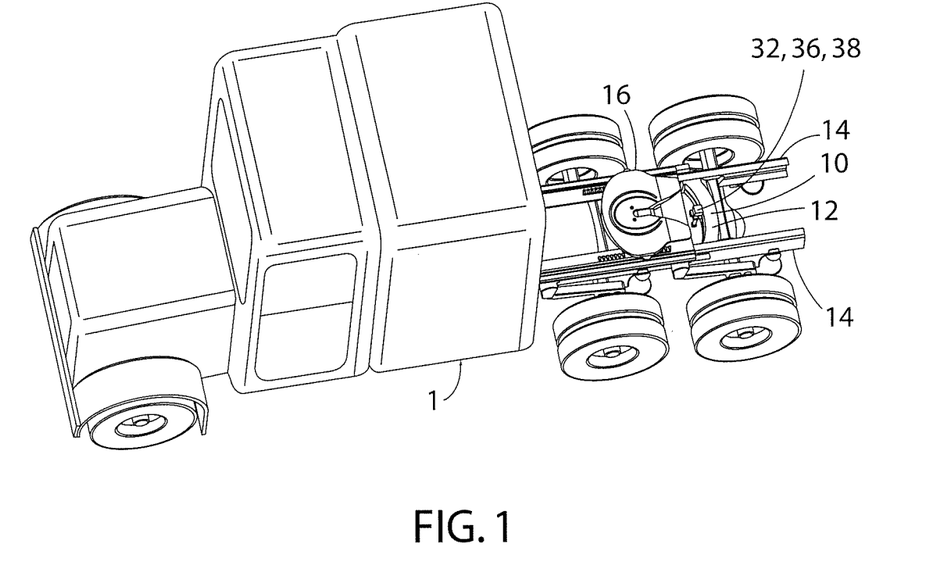
FIG. 1 is an isometric view of a tractor including components of an automated tractor-trailer coupler system supported by a frame assembly.
Figure 2:
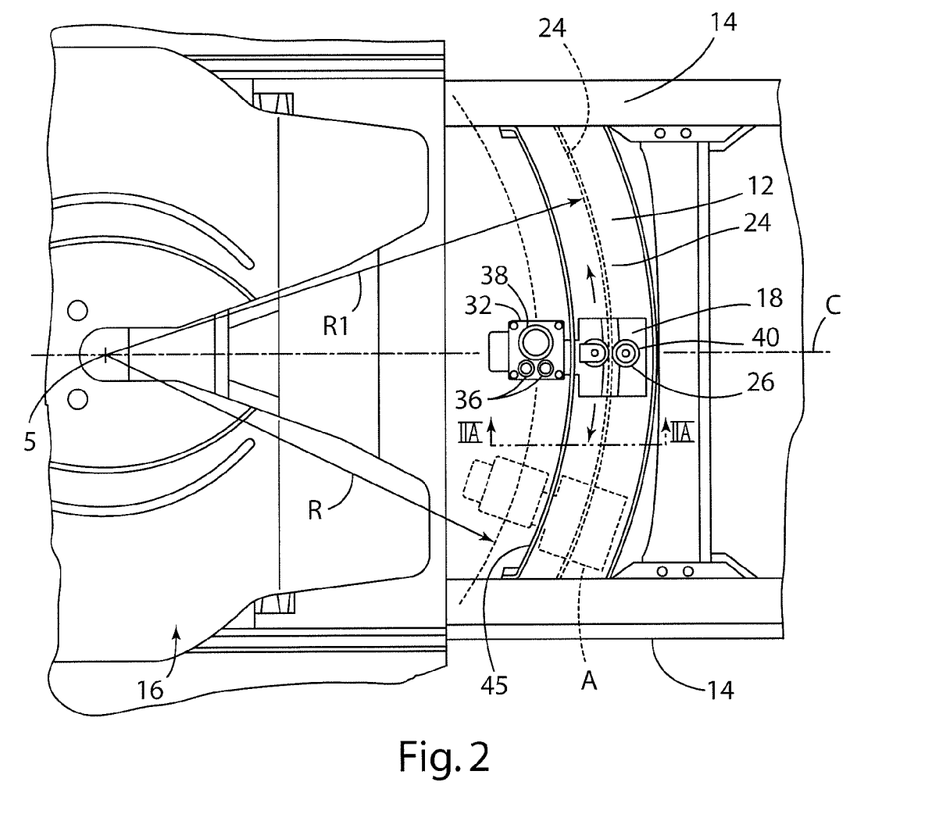
FIG. 2 is a partially fragmentary top plan view of a portion of a tractor frame assembly and a curved automatic coupler track, multi-function connector housing, and mating pinion of the tractor-trailer coupler system of FIG. 1.
Figure 5:
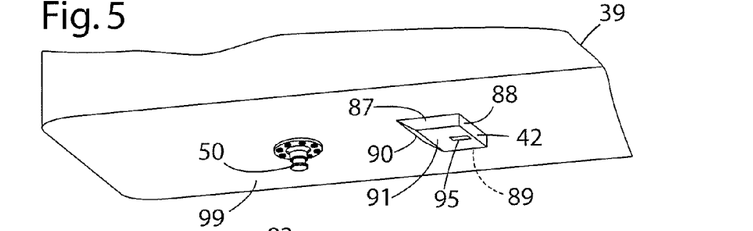
FIG. 5 is a partially fragmentary isometric view of the components of the coupler system that are mounted to a trailer.

With reference to FIGS. 1 and 2, a tractor-trailer coupling system 10 according to one aspect of the present invention provides for automatic and/or remotely-controlled powered coupling of electrical and pneumatic systems of a vehicle tractor 1 to the electrical and pneumatic systems of a trailer 39 (FIG. 5). Coupling system 10 includes a curved track 12 mounted to frame rails 14 of tractor 1 behind a fifth wheel assembly 16. As described in more detail below, in use, tractor 1 and trailer 39 are first mechanically coupled together utilizing a known fifth wheel hitch assembly 16 on tractor 1 and a kingpin 50 on trailer 39. Controller 2 of system 10 then causes a cart 18 to move along curved track 12 until electrical and pneumatic connectors or plugs 38 and 36 (FIG. 2A), respectively, on cart 18 are positioned directly below corresponding plugs or connectors 38A and 36A of a plug or connector 85 on trailer 39, at which point cart 18 stops. A pneumatic cylinder 30 is then extended to cause plugs 38 and 36 to engage corresponding plugs 38A and 36A, respectively, to thereby operably interconnect the electrical and pneumatic systems of tractor 1 and trailer 39. The pneumatic cylinder is then retracted and cart 18 is moved along curved track 12 to return cart 18 to a home or starting position. As also described in more detail below, track 12 is preferably mounted as close to the fifth wheel assembly 16 as possible to allow for misalignment between tractor 1 and a trailer 39 (FIG. 5) during coupling of a tractor 1 to a trailer 39.

Figure 2A:
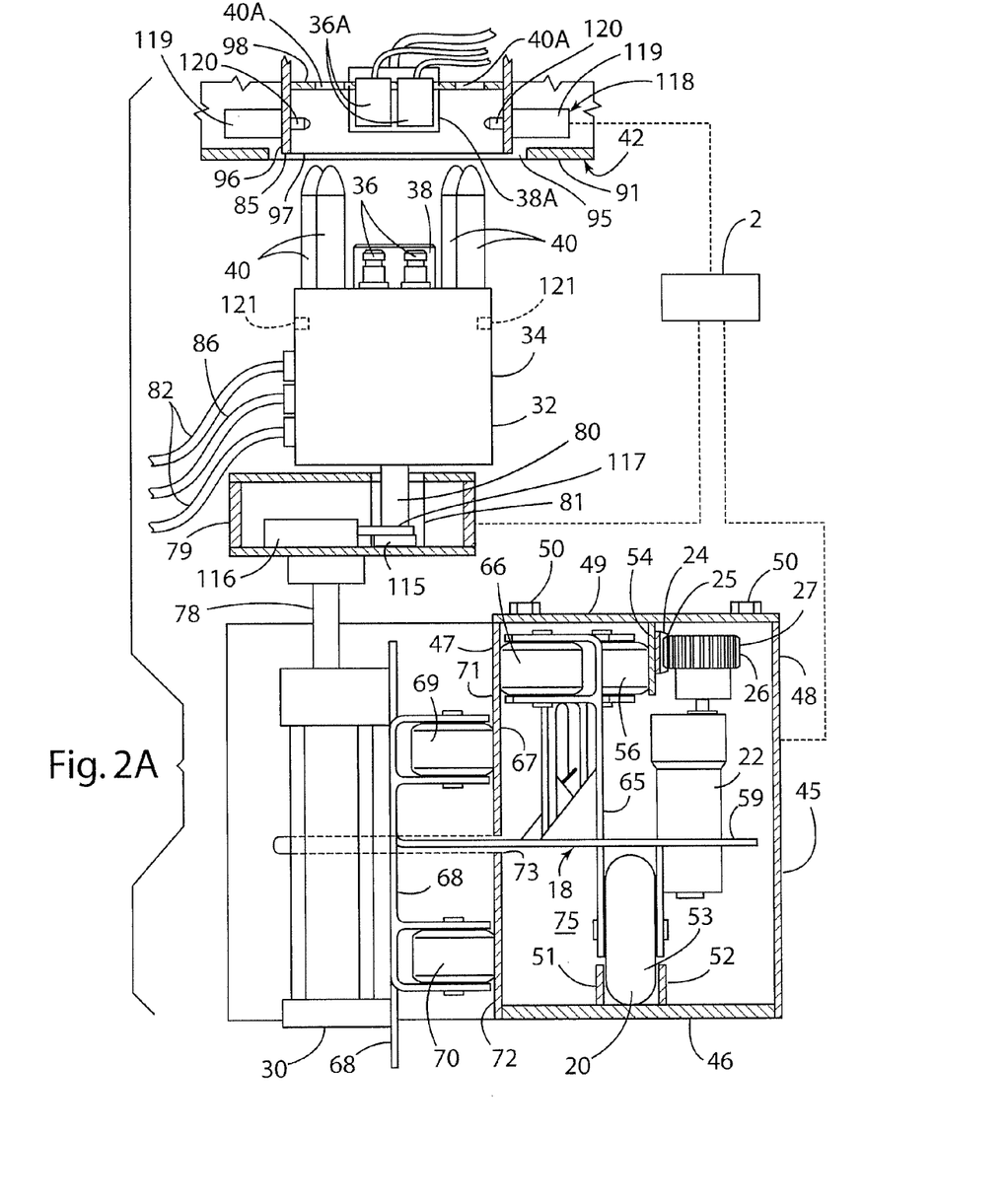
FIG. 2A is a cross-sectional view taken along the line IIA-IIA of FIG. 2.
Figure 3A:
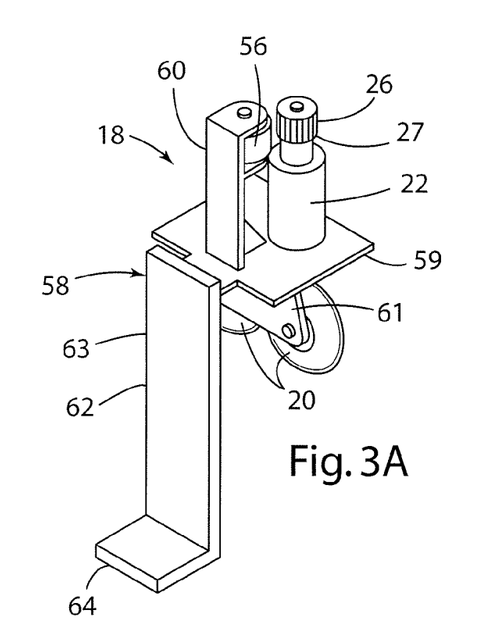
FIG. 3A is a perspective view of a movable cart that is configured to move along the track, wherein an associated outer cart housing has been removed.
Figure 3B:
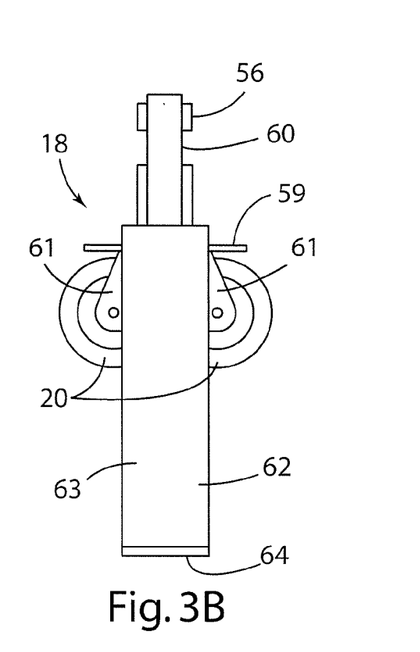
FIG. 3B is a rear elevational view of the cart of FIG. 3A.
Figure 3C:
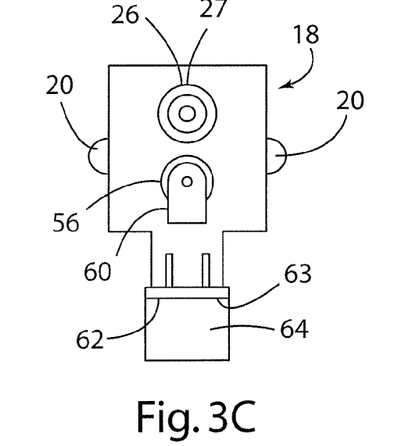
FIG. 3C is a top plan view of the cart of FIG. 3A.
Figure 3D:
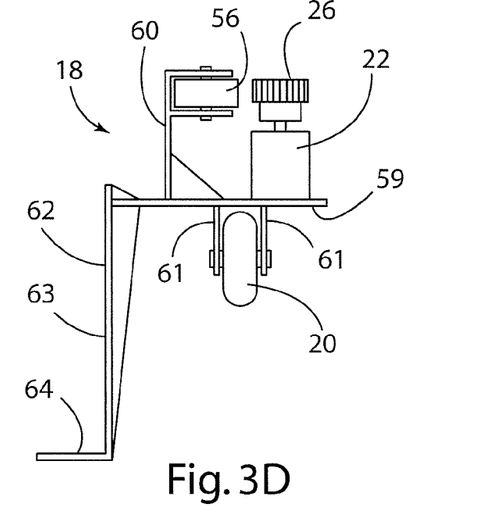
FIG. 3D is a side view of the cart of FIG. 3A.

With reference to FIGS. 2 and 2A, movable support assembly or cart 18 is movably mounted inside housing 45 of curved track assembly 12. Housing 45 of curved track assembly 12 includes a plate-like base 46, curved inner and outer sidewalls 47 and 48, respectively, and a removable top plate 49 that may be secured to the side walls 47 and 48 utilizing bolts 50 or other suitable fasteners. A pair of upright webs or walls 51 and 52 are welded or otherwise secured to base 46. The curved wall sections 51 and 52 define an upwardly-opening curved channel or slot 53 that receives rollers or wheels 20 (see also FIGS. 3A-D) of cart assembly 18. The curved channel 53 has a radius corresponding to the curvature of housing 45. Curved channel 53 has a radius "R1" (FIG. 2) about a vertical axis 5 corresponding to the location of kingpin 50 of trailer 39 when tractor 1 and trailer 39 are mechanically coupled.

Figure 4:
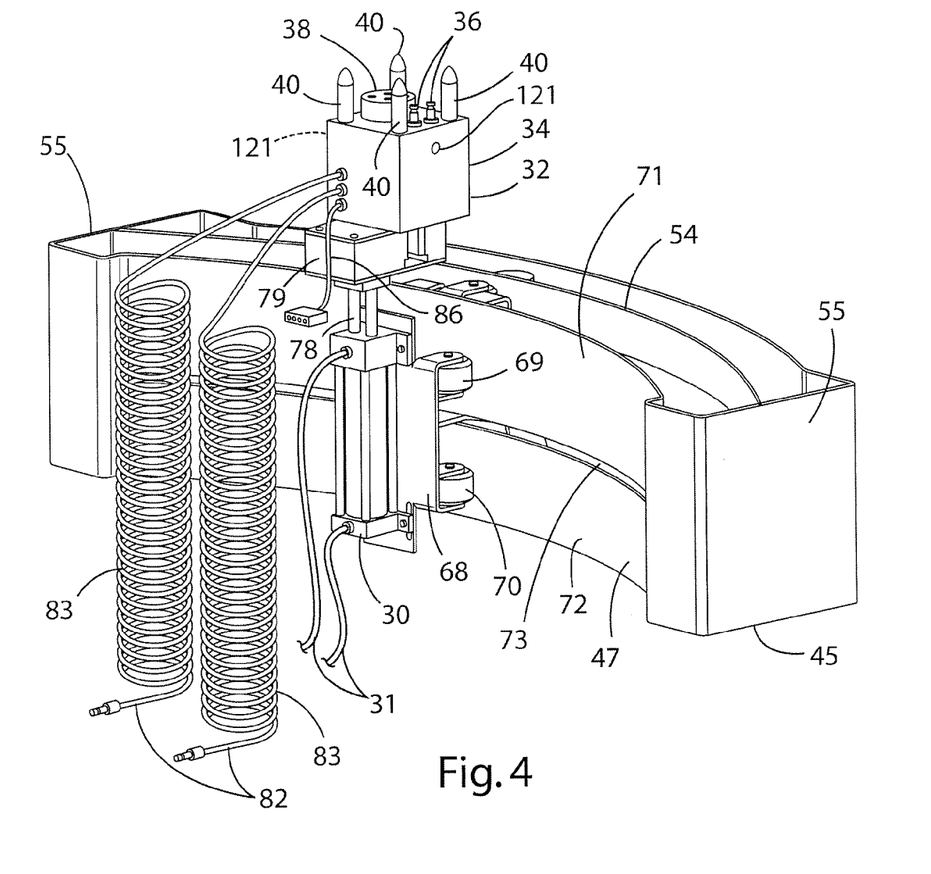
FIG. 4 is an isometric view of the automatic coupler track, multi-function connector housing and a linear pneumatic actuator.

A curved rack 24 having a plurality of teeth 25 is mounted to a curved wall or web 54 having a radius about vertical axis 5 that is slightly greater than radius R1 of curved channel 53. The opposite ends of rack 24 and/or curved web 54 may be welded or otherwise secured to ends 55 (FIG. 4) of housing 45 such that the central portion of rack 24 is not connected to housing 45. Alternately, web 54 and rack 24 may optionally be interconnected with a top plate 49 of housing 45, base 46, or other structure as required. Cart 18 includes an electric motor 22 (FIG. 2A) that drives a pinion gear 26 having a plurality of teeth 27 that engage teeth 25 of rack 24. As discussed in more detail below, actuation of electric motor 22 causes cart 18 to move along rack 24, with wheel 20 supporting at least a portion of the weight of cart 18 in curved channel 53. A wheel or roller 56 engages web 54 opposite teeth 25 of rack 24 to ensure that pinion gear 26 remains in engagement with rack 24.

With further reference to FIGS. 3A-3D, cart 18 includes a bracket or cart structure 58 including a horizontal plate or web 59. Wheel 56 is rotatably mounted to an upwardly-extending support or structure 60, and wheels 20 are rotatably mounted to support plates 61 for rotation about generally horizontal axes. The support plates 61 are welded or otherwise secured to horizontal plate 59. Cart 18 includes an actuator mount 62 for mounting a linear actuator such as pneumatic cylinder 30. Actuator mount 62 includes a vertically extending plate 63 and a horizontal plate or pad 64.

Referring again to FIG. 2A, cart 18 may include a wheel 66 that is rotatably mounted to a support structure 65 of cart 18 for rotation about a generally vertical axis. Wheel 66 is in rolling contact with convexly-curved inner surface 67 of inside wall 47 of housing 45. Cart 18 may also include upper and lower external wheels 69 and 70, respectively, that are mounted to a vertical plate structure 68 of cart 18 (see also FIG. 4). Upper wheel 69 engages a concavely-curved exterior surface 71 of inner side wall 47 of housing 45, and wheel 70 engages concavely-curved lower exterior surface 72 of inner side wall 47 of housing 45. A portion of horizontal plate 59 of cart 18 extends through an elongated slot 73 formed in side wall 47 of housing 45, such that wheels 69 and 70 of cart 18 are positioned exterior of housing 45. Wheels 20, 56, 66, gear 26, electric motor 22, and other components of cart 18 are positioned in interior space 75 of housing 45. Exterior wheels 69 and 70 are optional, and they are therefore not shown in FIGS. 1, 2, and 3A-3D.

Referring again to FIGS. 2A and 4, a linear powered actuator, such as a pneumatic cylinder 30, is mounted to vertical plate 68 of cart 18. Pneumatic cylinder 30 is connected to lines or conduits 31 that supply pressurized air from the vehicle's air supply (not shown) to provide for powered actuation of pneumatic cylinder 30. Solenoid-powered valves (not shown) control flow of pressurized air to cylinder 30 to control extension and retraction of cylinder 30. Alternately, pneumatic cylinder 30 may be mounted to actuator mount 62 if cart 18 is constructed according to the embodiment of FIGS. 3A-3D.

A multi-function connector assembly 34 is detachably connected to a connection box 79 that is connected to rod or rods 78 of pneumatic cylinder 30. Multi-function connector assembly 34 includes a downwardly-extending male connector 80 that detachably engages a connector 81 of connection box 79 to form a powered lock that selectively locks connector 34 to connection box 79 to ensure that connector 34 does not become detached from box 79/cylinder 30 except during coupling operations as described below. Male connector 80 of multi-function connector 34 may comprise a cylindrical pin having an enlarged disc-like end 115. A powered actuator such as a solenoid 116 is mounted inside connection box 79 to cause a connector 117 to shift in a horizontal direction. Connector 117 may comprise a pair of extensions having a U-shaped slot or opening that fits closely around male connector 80 above disc-like end 115 to prevent upward movement of multi-function connector 34 relative to connection box 79 when connector 117 is in an extended or locked position. Also, male connector 80 may have non-circular (e.g. square) cross-sectional shape, and female connector 81 may be configured to retain connector 80 and housing 32 at a selected angular orientation relative to box 79. Also, cylinder 30 may include a pair of rods 78 to prevent rotation of housing 32 and connector 34 relative to cart 18. Connector 117 is retracted or disengaged upon actuation of solenoid 116 to thereby permit multi-function connector 34 to be disconnected from connection box 79. System 10 also includes a proximity sensor or switch (not shown) that signals when/if connector 80 is positioned in engagement with female connector 81. In use, after multi-function connector 34 is connected/locked to connector 85, solenoid 116 is actuated to retract connector 117, and pneumatic cylinder 30 is retracted to thereby move connection box 79 down and away from multi-function connector 34. Connector assembly 34 does not become disconnected from connection box 79 if tractor 1 is driven by itself (i.e., without being connected to a trailer 39). Connection box 79 is secured to rod(s) 78 of cylinder 30 by threaded fasteners, welding, or other secure arrangement to ensure connection box 79 does not detach from rod(s) 78. Multi-function connector 34 includes a housing 32 and two male air nozzles 36 that can be detachably interconnected with corresponding female air connectors 36A of a connector 85 mounted to trailer 39 inside a housing 42. The connectors 36 and 36A may comprise known quick-disconnect connectors that are similar to connectors utilized for pneumatic tools or the like, or the connectors 36 and 36A could comprise other suitable connectors providing detachable interconnection of air lines to one another. The male connectors 36 are fluidly connected to pneumatic lines 82. Lines 82 provide pressurized air from the pneumatic system of tractor 1 to operate the brakes of the trailer 39. Lines 82 preferably include a plurality of coils 83 to provide for extension and retraction of lines 82 upon movement of multi-function connector 34 relative to tractor 1.

Referring again to FIG. 2A, multi-function connector 34 also includes an electrical plug or connector 38 that is configured to detachably interconnect with a corresponding electrical connector 38A of plug or connector 85 of trailer 39. In the illustrated example, electrical connectors 38 and 38A comprise an industry standard (SAE J560) male 7-pin electrical plug connector. Electrical lines 86 are electrically connected to the electrical system of the tractor 1.

Multi-function connector 34 also includes a mechanical guide/locating structure such as a plurality of tapered pins 40 that extend upwardly from housing 32. The four tapered pins 40 are configured to be received in circular openings 40A of connector 85 of trailer 39. Openings 40A preferably have a diameter that is slightly larger than pins 40 to provide for a sliding interconnection that ensures that pneumatic connectors 36 and electrical connectors 38 are properly aligned when multi-function connector 34 engages plug or connector 85 of trailer 39.

System 10 may also include a powered lock 118 (FIG. 2A) that mechanically interconnects connector assembly 34 to connector 85 to ensure that connectors 36, 36A and 38, 38A are not inadvertently disconnected. Powered lock 118 includes a pair of solenoids 119 mounted to connector 85/housing 42. Solenoids 119 selectively shift locking members or pins 120 into engagement with openings 121 of connector assembly 34. As discussed in more detail below, in use, solenoids 119 initially retain pins 120 in a retracted position. After connector assembly 34 is brought into engagement, with connector 85, solenoids 119 are actuated to shift pins 120 into engagement with openings 121, thereby securely locking connector 34 to connector 85. Solenoid 116 is then retracted to permit connector assembly 34 to be detached from connector box 79 upon retraction of cylinder 30.

Figure 6:
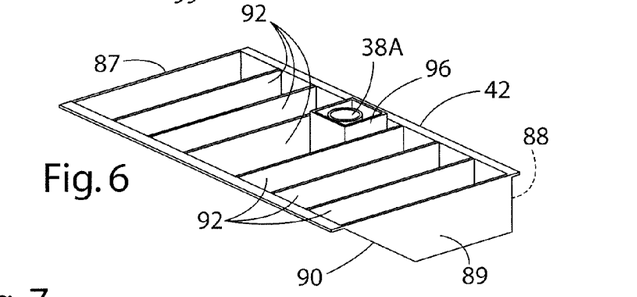
FIG. 6 is an isometric view of a trailer-mounted receptacle receiver.

With further reference to FIGS. 5 and 6, housing 42 comprises a box-like structure including generally upright or vertical side walls 87, 88, and 89, and a sloped or angled front side wall 90. A horizontal plate 91 is connected to the side walls 87-90. A plurality of vertical ribs 92 provide support for plate 91. Housing 42 may be made from steel plate sections that are welded together. During coupling of tractor 1 to trailer 39, the tractor 1 may initially be misaligned relative to trailer 39, such that fifth wheel assembly 16 of tractor 1 or other portions of tractor 1 come into contact with receptacle receiver housing 42. If such contact occurs, sloped side wall 90 of housing 42 will tend to deflect trailer 39 upwardly, thereby preventing damage to housing 42 and/or other components of the tractor 1 and trailer 39. An opening 95 in plate 91 of housing 42 (see also FIG. 2A) provides clearance whereby multi-function connector 34 can engage connector 85. Connector 85 may comprise a square tube-like structure 96 having an opening 97 that is square or rectangular. Thus, opening 97 has a shape that is substantially similar to housing 32 of multi-function connector 34 whereby housing 32 can fit inside opening 97. Openings 40A may be formed in a horizontal plate 98 disposed in tube-like structure 96. Plate 98 may be welded inside tube-like structure 96 at an intermediate position. Pneumatic connectors 36A and electrical connector 38A may be mounted to plate 98 of connector 85. Pneumatic connectors 36A are operably connected to the air system (not shown) of trailer 39 by pneumatic lines extending from connectors 36A. Similarly, electrical connector 38A is connected to the electrical system (not shown) of trailer 39 by electrical lines extending from connector 38A. When the tractor 1 and trailer 39 are operably coupled together, the electrical system of the trailer controls the trailer lights, and the pneumatic system of the trailer controls the brakes of the trailer. Connector 85 is recessed within housing 42 such that it is protected from damage that could otherwise occur during coupling of tractor 1 with trailer 39.

In use, cart 18 and multi-function connector 34 are initially in a home or rest position "A" (FIG. 2) at one end of track 24. Tractor 1 is then moved toward trailer 39, such that kingpin 50 of trailer 39 is mechanically coupled to fifth wheel connector assembly 16. Tractor 1 and trailer 39 may include an automated sensor system as disclosed in U.S. Pat. Nos. 6,452,485 and 6,285,278, each of which is incorporated herein by reference in their entirety. If the tractor 1 and trailer 39 include an automated sensor system, the automated sensor system may actuate coupler system 10 automatically upon indication of a positive coupling between kingpin 50 and fifth wheel assembly 16. Alternately, the driver or other user may actuate coupler system 10 after tractor 1 is connected to trailer 39 if the driver confirms that tractor 1 and trailer 39 have been properly coupled. System 10 may include a switch (not shown) mounted in the cab of tractor 1 to provide for actuation of coupler system 10 if an automated sensor system is not utilized.

Figure 7:
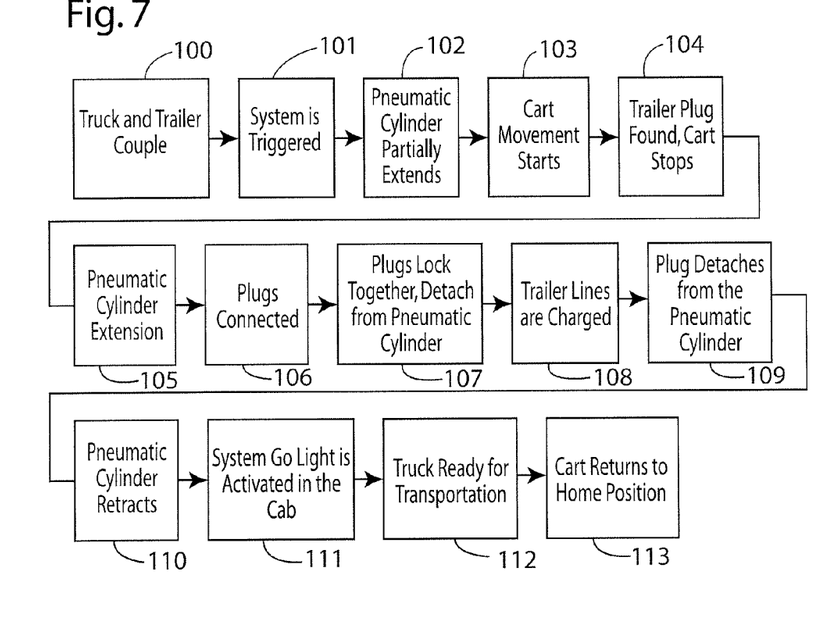
FIG. 7 is a system operation flow diagram.

Once tractor 1 and trailer 39 have been mechanically coupled (step 100 in FIG. 7), system 10 is actuated (step 101 in FIG. 7). In general, trailer 39 may not be directly aligned with tractor 1 immediately following connection of kingpin 50 and fifth wheel assembly 16, such that connector 85 of trailer 39 is not disposed along a center line "C" (FIG. 2) of tractor 1. When cart 18 is in the home or rest position "A", pneumatic cylinder 30 is in a fully retracted position, such that multi-function connector 34 is spaced-apart from lower surface 99 (FIG. 5) of trailer 39, and multi-function connector 34 is positioned adjacent housing 45 to thereby prevent damage to connector 34 during coupling of tractor 1 and trailer 39.

After coupling of the tractor 1 and trailer 39, and after the system is triggered 101, pneumatic cylinder 30 is actuated (step 102 in FIG. 7) to raise multi-function connector 34 to an intermediate position that is higher than the home or start position, but wherein the multi-function connector 34 is positioned lower than plate 91 (FIG. 5) of housing 42. Alternately, trailer 39 may include a bolster plate (not shown) mounted to lower side 99 of trailer 39 that is substantially flush with plate 91, with the bolster plate extending over and above the path of connector 34 along track 24. If trailer 39 includes a bolster plate, cylinder 30 can be actuated until the pins 40 contact the bolster plate. The system controller may be configured to determine that contact between pins 40 and the bolster plate has occurred when the pressure of air supplied to cylinder 30 rises sharply. The controller then closes the valve (not shown) supplying air to pneumatic cylinder 30. Alternately, the valve providing pressurized air to cylinder 30 may remain open, such that pins 40 are urged into contact with the bolster plate. Electric motor 22 is then actuated by the controller, causing cart 18 to move along rack 24. One or more sensors or switches (not shown) are positioned on multi-function connector 34. The sensors or switches may comprise a proximity sensor, limit switch, or other suitable device. The sensor or switch generates a signal when multi-function connector 34 is positioned directly below connector 45 on trailer 39. As discussed above, trailer 39 may be positioned at a non-zero angle relative to tractor 1 about vertical axis 5. Accordingly, cart 18 and multi-function connector 34 will stop at different locations along rack 24, depending upon the position of trailer 39 relative to tractor 1. In general, the cart 18 causes multi-function connector 34 to travel along an arc defined by the radius "R" (FIG. 2) about vertical axis 5. The sensing/detecting of connector 85 is generally designated 104 in FIG. 7.

After the cart 18 stops with multi-function connector 34 in alignment with connector 85, pneumatic cylinder 30 is actuated to thereby raise multi-function connector 34, causing pins 40 to engage openings 40A (FIG. 2A) and also causing pneumatic connectors 36 to connect to the corresponding female pneumatic connectors 36A. If trailer 39 includes a bolster plate (not shown), pins 40 will slide along the bolster plate until pins 40 are aligned with opening 95 in plate 91 of housing 42. Once the pins 40 are aligned with opening 95, pneumatic cylinder 30 will tend to cause connector 34 to move upwardly somewhat due to the air pressure in pneumatic cylinder 30. A sensor (not shown) may be utilized to detect the drop in air pressure, and the controller may be configured to interpret the pressure drop as a signal that the connector 34 is aligned with connector 85. Similarly, actuation of pneumatic cylinder 30 causes electrical connector 38 of multi-function connector 34 to connect to the corresponding connector 38A of connector 85. Alternately, if the valve supplying pressurized air to cylinder 30 remains open as cart 18 moves, cylinder 30 will extend automatically once pins 40 are aligned with opening 95 in housing 42.

As discussed above, system 10 may also include a powered mechanical plug locking device 118 that mechanically interconnects multi-function connector 34 to connector 85 to ensure that multi-function connector 34 does not become disconnected when tractor 1 is pulling trailer 39 on a road surface or the like. After the pneumatic cylinder 30 is extended to cause interconnection of multi-function connector 34 with connector 85, the plug lock 118 is actuated to thereby lock multi-function connector 34 to connector 85.

Air lines 82 are charged (pressurized) after a sensor (not shown) indicates that connector 34 has been properly connected to connector 85. Pneumatic cylinder 30 then retracts, causing the multi-function connector 34 to disengage from the connector box 79, leaving connector 34 connected to connector 85. The cart 18 is then moved back to its parked or home position "A" out of the way of any moving parts on the truck and trailer, e.g. near a frame rail 14. Finally, a signal is sent to a visual indicator (e.g. light) or audible indicator in the tractor cab indicating a positive connection.

To decouple tractor 1 from trailer 39, system 10 operates in substantially reverse order from the sequence described above and shown in FIG. 7. System 10 may be configured to require a manual input from a user to decouple tractor 1 from trailer 39.

System 1 includes a controller that is programmed to provide operation according to the sequence of FIG. 7. The controller is operably connected to sensors and actuators, and system 10 operates according to the following conditions and sequences:

Starting Conditions:
1. Solenoid valve controlling extension of pneumatic cylinder—closed
2. Solenoid valve controlling retraction of pneumatic cylinder—closed
3. Pneumatic and electrical connector lock(s)/solenoid(s)—retracted/unlocked
4. Electric motor—power disabled
5. Multi-function connector to connection box solenoid/lock—extended/locked Coupling Sequence:
1. Receive (optional) signal from kingpin/fifth wheel mating sensor system
2. Operator push button pressed to activate coupling sequence
3. Solenoid valve controlling extension of pneumatic cylinder opens, causing pneumatic cylinder to extend partially
4. Electric motor actuated, causing cart to move along track/rack
5. Pressure sensor senses pressure drop at instant cylinder begins to extend into opening of housing on trailer
6. Motor deactivates, cart stops
7. Plug proximity sensor senses plugs mated
8. Plug lock solenoids extend to lock male/female connectors together
9. Solenoid retracts to unlock connector block from connection block/pneumatic cylinder
10. Solenoid valve controlling extension of pneumatic cylinder closes and retract pneumatic cylinder solenoid valve opens
11. Pressure sensor senses pressure increase when cylinder is retracted
12. Solenoid valve controlling retraction of pneumatic cylinder closes
13. Electric motor drives reverse to return cart to rest/start position adjacent end of curved track
14. Proximity sensor signals cart returned to start position
15. Electric motor power disabled to stop cart at start position
16. Plug coupled indicator (in vehicle cab) enabled Driving Conditions:
1. Solenoid valve controlling extension of pneumatic cylinder closed
2. Solenoid valve controlling retraction of pneumatic cylinder closed
3. Pneumatic and electric lock or locks extended to lock connector to trailer
4. Electric motor power disabled
5. Connector block to pneumatic cylinder lock retracted/unlocked Uncoupling Sequence:
1. Operator push button pressed to activate decoupling sequence
2. Solenoid valve opens to extend cylinder, causing connector box on cylinder to contact bolster plate on trailer
3. Electric motor drives cart forward
4. Plug base proximity sensor senses multi-function connector engaged with connection box on pneumatic cylinder
5. Electric motor deactivates to stop cart
6. Solenoid extends to lock multi-function connector to connector box
7. Solenoids retract to unlock multi-function connector from trailer
8. Solenoid valve controlling extension of pneumatic cylinder closes and solenoid controlling retraction of pneumatic cylinder opens
9. Pressure sensor senses pressure increase when pneumatic cylinder is retracted
10. Solenoid valve controlling retraction of pneumatic cylinder closes
11. Electric motor drives reverse direction
12. Return proximity sensor signals that cart has returned to home or start position
13. Electric motor power disabled
14. Plug decoupled indicator (in vehicle cab) enabled The coupling system 10 may be installed at the time the tractor 1 and trailer 39 are manufactured, or the system 10 may be retrofitted to existing tractors 1 and trailers 39. Curved track 12 may be configured to be mounted (e.g., welded or mechanically fastened) to existing tractor frames, and housing 42 may be configured to be mounted to existing trailers.

These and other aspects, objects, and features of the present invention will be understood and appreciated by those skilled in the art upon studying the following specification, claims and attached drawings.

What is claimed is:

1. A coupling system for operably interconnecting at least one of an electrical system and a pneumatic system of a road tractor to a trailer when the road tractor and the trailer are connected together by a fifth wheel assembly and a kingpin to define a generally vertical pivot axis, the coupling system comprising:
a curved track configured to be mounted to a frame of a road tractor;
a cart structure movably connected to the curved track for powered movement along a generally horizontal curved path;
a connector assembly movably and releasably connected to the cart structure for powered movement in a direction that is transverse to the curved path, the connector assembly including at least one of a first electrical connector configured to be connected to an electrical system of a road tractor and a first pneumatic connector configured to be connected to a pneumatic system of a road tractor;

at least one of a second electrical connector configured to be electrically coupled to an electrical system of a trailer and a second pneumatic connector configured to be connected to a pneumatic brake system of a trailer; and wherein:

in use the one second electrical connector or second pneumatic connector are mounted to a trailer, and, after connection of a trailer kingpin to a fifth wheel assembly, the cart moves from a first position along the curved path until the connector assembly is positioned in registry with the one second electrical connector or second pneumatic connector, followed by movement of the connector assembly relative to the cart structure to couple the one first electrical or pneumatic connector to the one second electrical or pneumatic connector whereby at least one of a tractor electrical and pneumatic system is operably coupled to at least one of a trailer electrical and pneumatic system, respectively, and wherein the connector assembly disconnects from the cart structure after coupling of the electrical or pneumatic connectors.

2. The coupling system of claim 1, wherein:

the connector assembly includes both the first electrical connector and the first pneumatic connector, and wherein the coupling system includes both the second electrical connector configured to be electrically coupled to an electrical system of a trailer and the second pneumatic connector configured to be connected to a pneumatic brake system of a trailer.

3. The coupling system of claim 2, wherein:

the connector assembly is releasably connected to the cart structure such that the cart structure can be disconnected from the connector assembly and moved away from the connector assembly after the first and second electrical connectors are interconnected and after the first and second pneumatic connectors are interconnected.

4. The coupling system of claim 1, including:

an electric motor providing powered movement of the cart structure along the curved path.

5. The coupling system of claim 4, wherein:

the electric motor is mounted to the cart structure.

6. The coupling system of claim 5, wherein:

the curved track includes a curved rack having a plurality of teeth positioned to define an arc, and wherein:

the electric motor drives a pinion gear that engages the teeth of the curved rack to move the cart structure along the curved path.

7. The coupling system of claim 6, wherein:

the curved track defines at least one upwardly-facing support surface extending along the track; and including:

at least one roller mounted to the cart structure to movably support the cart structure on the upwardly-facing support surface.

8. The coupling system of claim 1, including:

a linear actuator mounted to the cart structure and providing substantially linear movement of the connector assembly relative to the cart structure.

9. The coupling system of claim 8, wherein:

the linear actuator comprises a pneumatic cylinder that causes the connector assembly to move in a substantially vertical direction relative to the cart structure.

10. The coupling system of claim 1, wherein:

the curved path comprises an arc defining a center at the vertical pivot axis.

11. A coupling system for operably interconnecting at least one of an electrical system and a pneumatic system of a road tractor to a trailer when the road tractor and the trailer are connected together by a fifth wheel assembly and a kingpin to define a generally vertical pivot axis, the coupling system comprising:

a curved track defining at least one upwardly-facing support surface extending along the track, the curved track configured to be mounted to a frame of a road tractor, the curved track including a curved rack having a plurality of teeth positioned to define an arc:

a cart structure movably connected to the curved track for powered movement along a generally horizontal curved path;

at least one roller mounted to the cart structure to movably support the cart structure on the upwardly-facing support structure;

an electric motor providing powered movement of the cart structure along the curved path, wherein the electric motor is mounted to the cart structure, and wherein the electric motor drives a pinion gear that engages the teeth of the curved rack to move the cart structure along the curved path;

a connector assembly movably connected to the cart structure for powered movement in a direction that is transverse to the curved path, the connector assembly including at least one of a first electrical connector configured to be connected to an electrical system of a road tractor and a first pneumatic connector configured to be connected to a pneumatic system of a road tractor;

at least one of a second electrical connector configured to be electrically coupled to an electrical system of a trailer and a second pneumatic connector configured to be connected to a pneumatic brake system of a trailer; and wherein:

in use the one second electrical connector or second pneumatic connector is mounted to a trailer, and, after connection of a trailer kingpin to a fifth wheel assembly, the cart moves from a first position along the curved path until the connector assembly is positioned in registry, with the one second electrical connector or second pneumatic connector, followed by movement of the connector assembly relative to the cart structure to couple the one first electrical or pneumatic connector to the one second electrical or pneumatic connector whereby at least one of a tractor electrical and pneumatic system is operably coupled to at least one of a trailer electrical and pneumatic system, respectively;

the curved track defines a channel having a curved shape in plan view, and the upwardly-facing support surface comprises a base surface of the curved channel whereby the roller is at least partly disposed in the curved channel.

12. The coupling system of claim 11, including:

a housing defining an interior space; and wherein:

at least a portion of the cart structure and the curved rack are disposed in the interior space.

13. The coupling system of claim 12, wherein:

the housing defines a sidewardly-facing curved surface;

the one roller comprises a first roller; and including:

a second roller mounted to the cart surface in rolling contact with the sidewardly-facing curved surface.

14. The coupling system of claim 13, wherein:

the sidewardly-facing curved surface comprises a concave exterior surface of the housing and wherein the second roller is disposed outside of the housing.

15. In a tractor-trailer having a tractor that includes electrical and pneumatic systems, and a trailer having a kingpin and electrical and pneumatic systems, and wherein the tractor includes a fifth wheel hitch assembly that couples to the kingpin and provides pivotable movement of the trailer relative to the tractor, the improvement comprising:
   a coupling system for coupling the electrical and pneumatic systems of the tractor to the electrical and pneumatic systems of the trailer, respectively, the coupling system comprising:
   a cart structure movably mounted to the tractor for movement along a curved path;
   a powered actuator that moves the cart structure along the curved path upon actuation of the powered actuator;
   a connector assembly including a first electrical connector and a first pneumatic connector, wherein the connector assembly is detachably and movably interconnected to the cart structure;
   a second electrical connector attached to the trailer;
   a second pneumatic connector attached to the trailer; and wherein:
   the cart structure moves along the curved path upon actuation of the powered actuator and the connector assembly moves relative to the cart structure to thereby interconnect the first and second electrical connectors and the first and second pneumatic connectors to operably interconnect the electrical and pneumatic systems of the tractor and the trailer, and wherein the connector assembly detaches from the cart structure after the first and second electrical connectors are interconnected and after the first and second pneumatic connectors are interconnected.

16. The tractor-trailer of claim 15, including:
   a curved guide structure mounted to the trailer, and wherein:
   the cart structure is movably connected to the curved guide structure.

17. The tractor-trailer of claim 16, wherein:
   the trailer pivots about a generally vertical pivot axis relative to the tractor; and
   the curved guide structure forms an arc about the pivot axis.

18. The tractor-trailer of claim 17, wherein:
   in use, the cart structure moves along the curved path and stops when the connector assembly is positioned adjacent the second electrical and pneumatic connectors;
   the connector assembly moves relative to the cart structure after the cart structure stops to couple the first and second electrical connectors and the first and second pneumatic connectors.

19. The tractor-trailer of claim 17, including:
   an electric motor providing powered movement of the cart structure along the curved path.

20. The tractor-trailer of claim 15, including:
   a protective housing mounted to a lower side of the trailer; and wherein:
   the second electrical connector and the second pneumatic connector are mounted to the trailer and disposed inside the protective housing.

21. The tractor-trailer of claim 20, wherein:
   the housing defines a downwardly-facing lower surface and an opening in the lower surface; and wherein:
   the second electrical and pneumatic connectors are positioned in vertical registry with the opening.

22. In a tractor-trailer having a tractor that includes electrical and pneumatic systems, and a trailer having a kingpin and electrical and pneumatic systems, and wherein the tractor includes a fifth wheel hitch assembly that couples to the kingpin and provides pivotable movement of the trailer relative to the tractor, wherein the trailer pivots about a generally vertical pivot axis relative to the tractor, the improvement comprising:
   a coupling system for coupling the electrical and pneumatic systems of the tractor to the electrical and pneumatic systems of the trailer, respectively, the coupling system comprising:
   a curved guide structure mounted to the trailer;
   a cart structure movably mounted to the tractor for movement along a curved path, wherein the cart structure is movably connected to the curved guide structure, and the curved guide structure forms an arc about the pivot axis and wherein opposite ends of the curved guide structure are rigidly attached to frame rails of the tractor;
   a connector assembly including a first electrical connector and a first pneumatic connector, wherein the connector assembly is movably interconnected to the cart structure;
   a second electrical connector attached to the trailer;
   a second pneumatic connector attached to the trailer; and wherein:
   the cart structure moves along the curved path and the connector assembly moves relative to the cart structure to thereby interconnect the first and second electrical connectors and the first and second pneumatic connectors to operably interconnect the electrical and pneumatic systems of the tractor and the trailer; and
   opposite ends of the curved guide structure are rigidly attached to frame rails of the tractor.

23. A method of retrofitting an existing tractor-trailer vehicle with a coupling system that operably interconnects electrical and pneumatic systems of a tractor and a trailer upon hitching a trailer to a tractor utilizing a fifth wheel hitch and kingpin; the method comprising:
   mounting a curved guide structure to a frame of a tractor;
   providing a cart structure that is movably connected to the guide structure for movement of the cart structure along a curved path;
   providing a connector assembly that is detachably and movably connected to the cart structure, wherein the connector assembly includes a first electrical connector and a first pneumatic connector;
   ensuring that the first electrical connector is connected to an electrical system of a tractor;
   ensuring that the first pneumatic connector is connected to a pneumatic system of a tractor;
   mounting second electrical and pneumatic connectors to a trailer at a location that is horizontally spaced-apart from a kingpin of the trailer;
   ensuring that the second electrical connector is connected to an electrical system of the trailer;
   ensuring that the second pneumatic connector is connected to a pneumatic system of the trailer; and
   configuring the coupling system such that the cart structure moves along the curved path and the connector assembly moves to interconnect the first and second electrical and pneumatic connectors;
   wherein the connector assembly detaches from the cart structure while the first and second electrical and pneumatic connectors are interconnected such that the cart structure can be moved relative to the first and second electrical and pneumatic connectors.

* * * * *

UNITED STATES PATENT AND TRADEMARK OFFICE
CERTIFICATE OF CORRECTION

| | |
|---|---|
| PATENT NO. | : 8,505,949 B2 |
| APPLICATION NO. | : 12/758173 |
| DATED | : August 13, 2013 |
| INVENTOR(S) | : Kevin Temple et al. |

It is certified that error appears in the above-identified patent and that said Letters Patent is hereby corrected as shown below:

<u>On the Title Page</u>
Item [75] Inventors, second joint inventor Ryan Sullivan; delete "Rochester, MI" and insert
--Rochester, MN--;

<u>In the Claims</u>
<u>Claim 11 Column 10,</u>
line 39, "filth" should be --fifth--;
line 41, "registry," should be --registry--.

Signed and Sealed this
Fifteenth Day of April, 2014

Michelle K. Lee
*Deputy Director of the United States Patent and Trademark Office*